United States Patent [19]

Andrzejewski

[11] 4,010,573

[45] Mar. 8, 1977

[54] SEALING OR TRIMMING STRIP STRUCTURE

[75] Inventor: Heinz Andrzejewski, Viersen, Germany

[73] Assignee: Draftex Development AG, Zug, Switzerland

[22] Filed: Mar. 13, 1975

[21] Appl. No.: 558,174

Related U.S. Application Data

[63] Continuation of Ser. No. 330,410, Feb. 7, 1973, abandoned.

[30] Foreign Application Priority Data

Feb. 18, 1972 United Kingdom ............... 7521/72

[52] U.S. Cl. .................................... 49/479; 49/491; 49/498; 52/401; 52/716; 428/122; 428/457
[51] Int. Cl.² .................. E06B 7/232; E06B 7/215
[58] Field of Search ........... 49/479, 490, 491, 498; 52/716, 401, 717; 428/122, 128, 130, 457, 358

[56] References Cited

UNITED STATES PATENTS

| | | | |
|---|---|---|---|
| 2,722,043 | 11/1955 | Nenzell | 49/479 |
| 2,767,814 | 10/1956 | Johnson | 49/491 |
| 2,974,079 | 3/1961 | Korotkevich | 49/479 |
| 3,023,466 | 3/1962 | Landis | 49/479 |
| 3,108,338 | 10/1963 | Stec et al. | 49/479 |
| 3,167,825 | 2/1965 | Zoller | 49/490 |
| 3,172,800 | 3/1965 | Truesdell | 52/717 |
| 3,467,423 | 9/1969 | Schlegel et al. | 52/716 |
| 3,638,359 | 2/1972 | Kruschwitz | 52/717 X |
| 3,717,955 | 2/1973 | Urbanick | 49/479 |

*Primary Examiner*—Harold Ansher
*Attorney, Agent, or Firm*—Mason, Mason & Albright

[57] ABSTRACT

At a mitre joint between two adjacent portions of a channel-shaped sealing or trimming strip structure such as for trimming a flange around a door opening in an automobile, for example, the mutually contacting tapering ends of the two adjacent portions of the strip structure are reinforced by an L-shaped reinforcing member which bridges across the joint and is secured to these portions, or by separate straight reinforcing members fitted to each of these portions.

7 Claims, 6 Drawing Figures

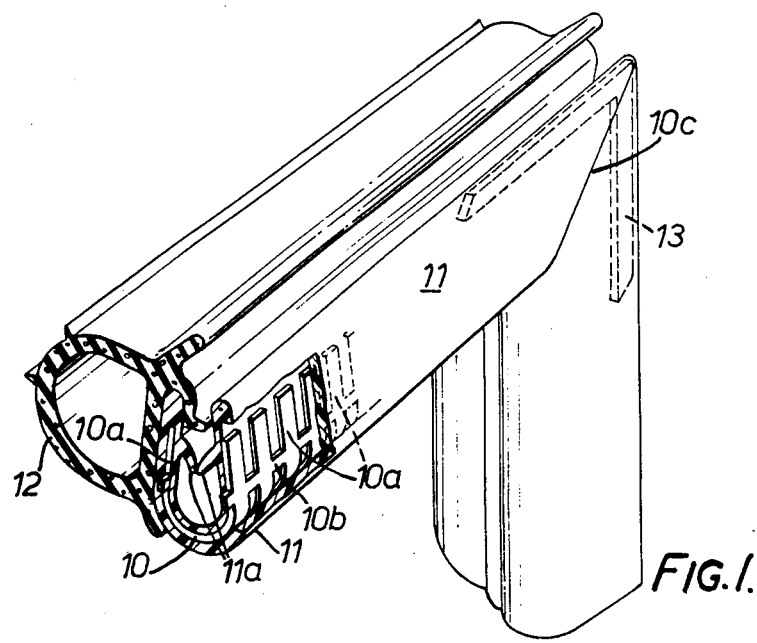
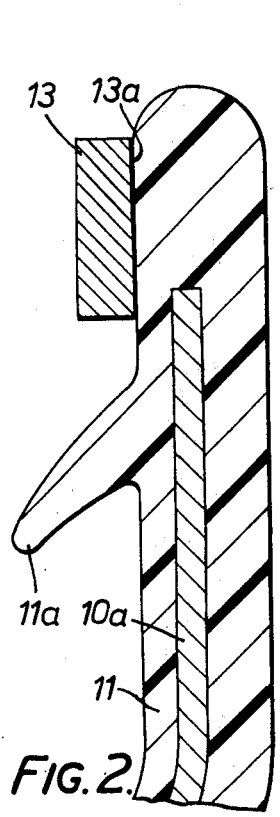
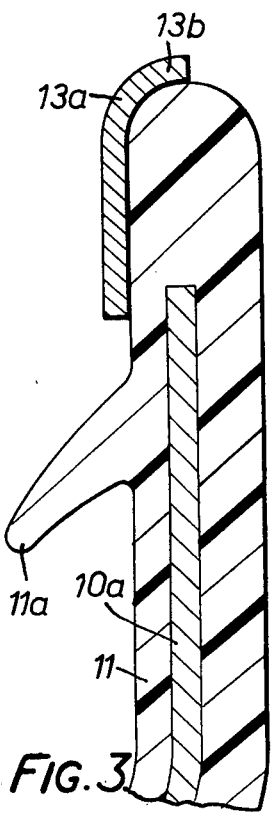
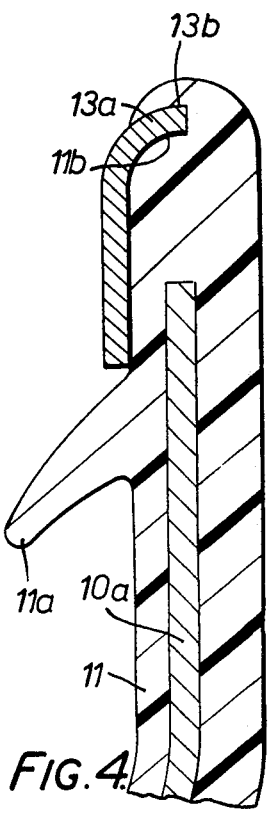

SEALING OR TRIMMING STRIP STRUCTURE

CROSS REFERENCE TO RELATED APPLICATION

This application is a Continuation of my application Ser. No. 330,410, filed Feb. 7, 1973, now abandoned.

BACKGROUND OF THE INVENTION

The invention relates to trimming or sealing strip structures. More particularly, it relates to trimming or sealing strip structures of generally channel-shaped form, such as may be used, for example, in automobile construction. Such trimming or sealing strip structures are used, particularly in the automobile industry, to cover sharp or rough metal edges and, in a door opening, to provide a support for a door seal. When the trimming or sealing strip structure extends around a right angled corner, it is necessary to form a miter joint, but the tapering end portions at the apex of the joint are inevitably weak even if adhered to each other and may present an untidy appearance if merely covered by adhesive tape.

It is an object of the invention to provide an improved miter joint between portions of a channel-shaped trimming or sealing strip structure.

BRIEF SUMMARY OF THE INVENTION

According to the invention there is provided a channel-shaped trimming or sealing strip structure having two portions of its length disposed adjacent each other and shaped to form a miter joint, and a reinforcing member extending along and secured to each of said portions.

In particular the reinforcing member is an L-shaped metal strip which can be secured to the adjacent portions of the trimming or sealing strip structure by adhesive or by each part of the L-member fitting tightly into a pocket extending along a separate one of the two adjacent portions. Alternatively a separate straight reinforcing member can be fitted to each portion.

DESCRIPTION OF THE DRAWINGS

In the drawings:

FIG. 1 is a perspective view, partly broken away, of a corner portion of a trimming or sealing strip structure combined with a rubber door seal;

FIG. 2 is a view showing a section through a part of the trimming or sealing strip structure;

FIGS. 3 and 4 are similar views to FIG. 2 showing alternative constructions;

DESCRIPTION OF PREFERRED EMBODIMENTS

Figure 5:
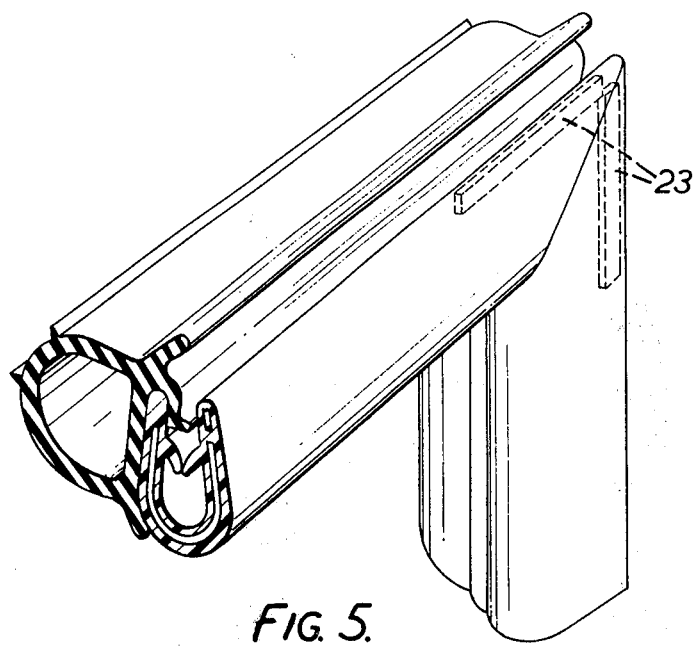
FIGS. 5 and 6 are views corresponding to FIGS. 1 and 2 showing a further alternative embodiment.

The construction of trimming or sealing strip structure which is to be described by way of example, is intended for fitment to the flanges formed around the openings for the doors in an automobile or other vehicle and is combined with a closed-cell rubber section which serves as a door seal when the door is closed.

Referring to FIGS. 1 and 2, it will be seen that the trimming or sealing strip structure, which is of known construction, comprises a metal carrier 10 consisting of clips 10a of U-shape interconnected by two longitudinally extending connecting pieces 10b, the carrier 10 having channel-shaped flexible plastic covering material 11 which has two inwardly projecting lips 11a. The latter form a seal against the sides of the flange and also give retention when the trimming or sealing strip structure is fitted over the flange. A closed-cell rubber sealing member 12 is bonded to the plastic in manufacture to provide the door sealing element.

When the trimming or sealing strip structure is to be fitted to a flange which has a right angle or other sharp corner it is necessary to form a miter joint 10c in the trimming or sealing strip structure. However, in cutting the trimming or sealing strip structure at an angle to its longitudinal axis to form miter joint 10c the connecting pieces 10b and clips 10a of the carrier 10 are severed and the severed pieces become loose and may fall out of the plastic covering 11. Thus, the plastic covering 11 in the area of the joint 10c is no longer supported by the metal carrier so that, in the region of the joint, the trimming or sealing strip structure is not held securely against the flange and may move away from the flange giving an untidy appearance.

The present invention overcomes this disadvantage by providing a reinforcing member in the region of the joint which, in the first construction shown, takes the form of a generally L-shaped metal piece 13. The reinforcing member 13 is secured in a suitable manner to the inner surface of that limb of the plastic covering 11 which does not have the door seal 12 affixed to it, the arms of the reinforcing member 13 extending sufficiently far along the trimming or sealing strip structure to overlap the uncut portion of the trimming or sealing strip structure in order to provide rigid support for the otherwise unsupported plastic covering 11 in the area of the joint 10c.

Preferably, the reinforcing member 13 is of metal and is provided with a plastic coating 13a, for example of polyvinyl chloride, on the face which abuts the inner face of the plastic covering 11 so that the reinforcing member 13 can be secured to the plastic covering 11, for example by welding using high frequency heating. Of course, other methods of securing the reinforcing member 13 to the plastic covering 11 may be used. Moreover, the plastic covering 11 can be formed during extrusion on to the metal carrier with pockets to accommodate the arms of the reinforcing member 13, in which case adhesion of the reinforcing member 13 to the plastic covering 11 is not necessary. In this case the arms of the reinforcing member 13 will be inserted into the pockets in the respective ends of the plastic covering 11 prior to the joining of the ends to the miter joint 10c.

In order to increase the strength for a given thickness, the reinforcing member 13 may be upset along its outer edge 13b as shown in FIG. 3. This also serves to give a lead for assembly when the trimming or sealing strip structure is fitted over the flange. In this case, in order that the edge 13b will not be seen after assembly to the flange, the plastic covering 11 may be formed with a recess 11b, FIG. 4, to accommodate the overturned edge 13b.

Figure 6:
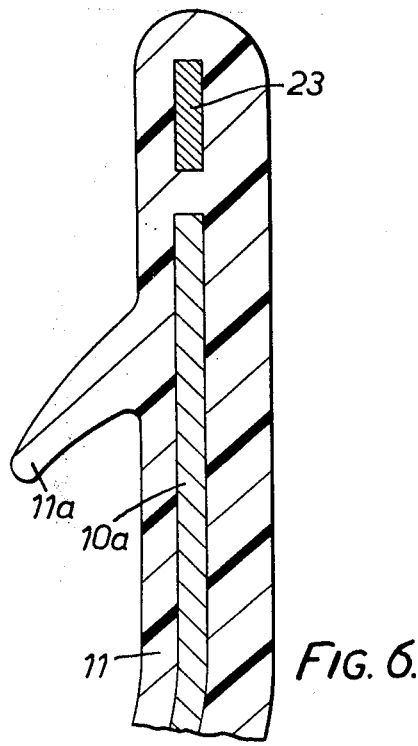

In a further alternative construction shown in FIGS. 5 and 6, two separate straight reinforcing members 23 are applied to the miter joint, each member fitting tightly within a pocket extending along the tapered end of a separate portion of the trimming or sealing strip structure. This construction enables the two reinforcing members 23 to be fitted into the ends of the respective trimming or sealing strip structure portions while they are apart, the two portions then being brought together in mutually perpendicular directions until the cut surfaces abut and adhere to one another.

Whilst it is preferred to use metal for the reinforcing member it is, of course, possible to use other materials for the reinforcing member, for example plastics materials.

By the use of such a reinforcing member the rigidity of the trimming or sealing strip structure in the area of the joint is comparable to the rigidity elsewhere and movement of the trimming or sealing strip structure away from the flange in the region of the joint is avoided.

Although the invention has been described with the trimming or sealing strip structure combined with a door seal it will be appreciated that the invention is applicable to trimming or sealing strip structure without such door seal. Furhermore the word 'miter' as used herein is not intended to limit the invention to joints in which each portion of the joint is tapered at 45°, but rather to include tapers of greater or less than 45°.

I claim:

1. A trimming or sealing strip structure comprising at least two mutually inclined channel-shaped portions each defined by first and second parallel and opposed side wall with a base between them, the two portions being mutually positioned and having respective ends mutually shaped to form a mitered joint between the two said portions with one end of each of the first and second side walls and the base of one channel-shaped portion being in contact with, respectively, one end of the first and second side walls and the base of the other channel-shaped portion, the channel openings of the two portions facing outwardly of the mitered joint, each said channel-shaped portion comprising carrier means of relatively rigid material defining a U-channel and channel-shaped flexible covering material covering the carrier means, the flexible covering material being free of the relatively rigid material of the carrier means in the marginal regions running along the outer edges of the side walls of the channel-shaped portions, and two longitudinal reinforcing members of substantially rigid material each embedded in a corresponding outboard peripheral part of the said marginal region of a respective one of two said first side walls, the reinforcing members each lying parallel to the outboard surfaces of the channel in which they are respectively embedded and extending along the said regions to the contacting ends of the said first side walls and there meeting each other proximate the outboard portion of the corner which said mitered joint forms whereby the flexible covering material at said outboard portion is stiffened.

2. A structure according to claim 1, in which the two reinforcing members are integrally connected to each other where they meet.

3. A structure according to claim 1, in which the two reinforcing members are separate from each other.

4. A structure according to claim 1, in which the reinforcing members are made of metal.

5. A structure according to claim 1, in which each reinforcing member is embedded in a respective preformed pocket in the flexible covering material.

6. A structure according to claim 1, in which the flexible covering material is plastics material.

7. A structure according to claim 1, including a sealing member attached to and running along the outside face of at least one of the two said second side walls.

* * * * *